UNITED STATES PATENT OFFICE

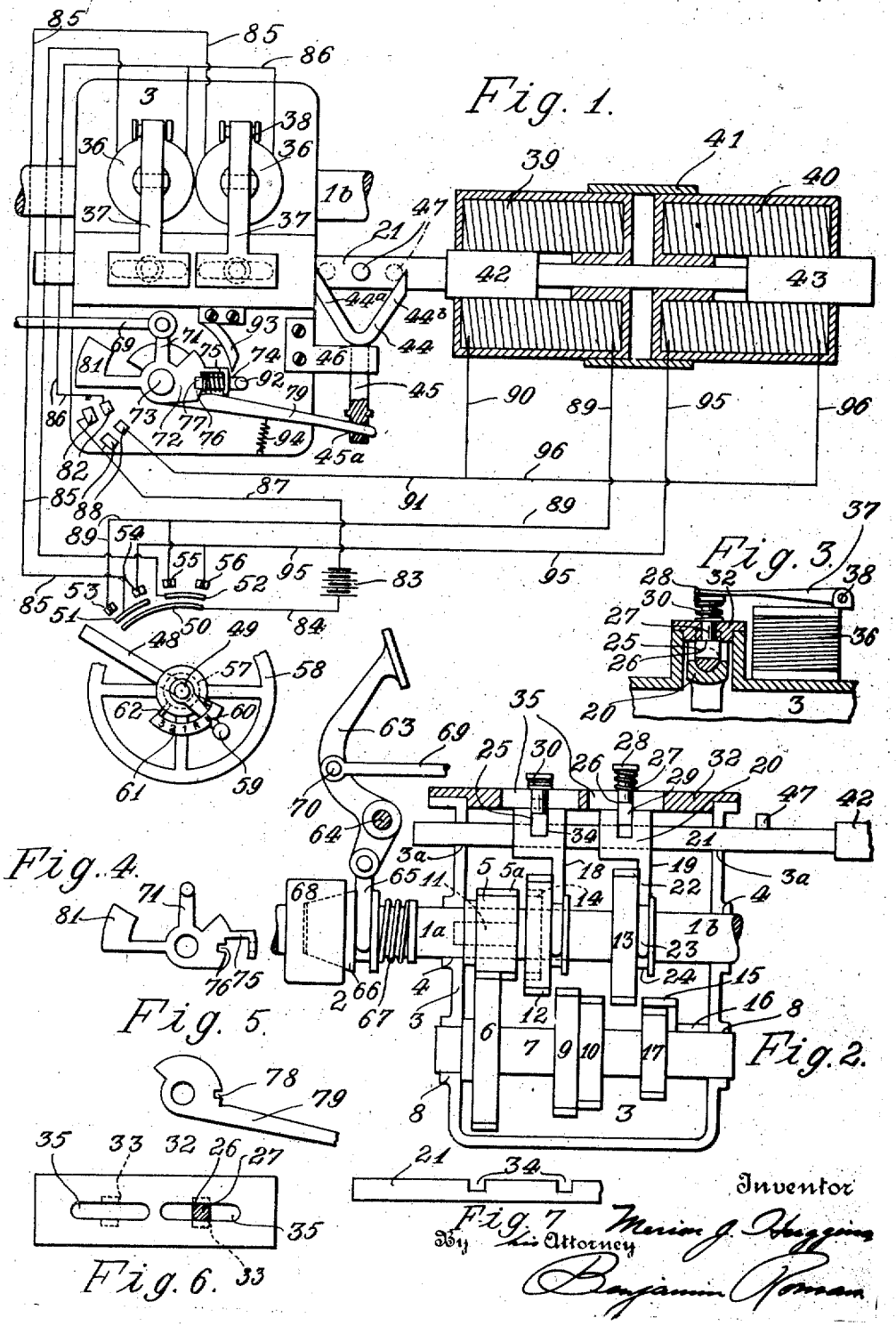

MERION J. HUGGINS, OF NEW YORK, N. Y.

SPEED-CONTROLLING MECHANISM FOR AUTOMOBILES.

1,207,170.  Specification of Letters Patent.  Patented Dec. 5, 1916.

Application filed June 1, 1916. Serial No. 101,058.

*To all whom it may concern:*

Be it known that I, MERION J. HUGGINS, a citizen of the United States, and resident of the city of New York, in the county of Kings and State of New York, have invented certain new and useful Improvements in Speed-Controlling Mechanism for Automobiles, of which the following is a specification.

This invention relates to automobiles, particularly to the speed controlling mechanism thereof, and its principal object is to provide simple, efficient, reliable, and improved means for controlling the speed of the automobile, and for driving the automobile wheels at a variable speed relatively to the speed of the engine or prime mover.

Another object is to provide improved, conveniently operated, and readily responsive means for controlling the changing of the speeds and reversing of the wheels.

Other objects and advantages will hereinafter appear.

In the accompanying drawings, Figure 1 is a general plan view showing the operating mechanism of the automobile gear transmission, and the electric circuits in connection therewith. Fig. 2 is a sectional elevation of part of said mechanism and of the automobile gear transmission, to which the invention is here shown as adapted. Fig. 3 is a sectional end elevation of part of the mechanism shown in Figs. 1, and 2. Figs. 4, 5, 6, and 7 are details of said mechanism.

A shaft 1, driven by the automobile engine, not shown, drives a section $1^a$ thereof, which is split therefrom at clutch 2, Fig. 2, and extends to the gear-casing 3, where it is mounted in bearings 4 of said casing. The shaft-section $1^a$ carries a wide gear 5 which drives a gear 6 that is keyed upon and drives a counter-shaft 7 mounted in bearings 8 of said casing. Said counter-shaft carries drive gears 9 and 10 of different sizes, and the rear shaft-section $1^b$ of the drive shaft, split from shaft-section $1^a$ at 11 and running independently thereof, carries coöperating transmission gears 12 and 13 splined to shift thereupon so that any one of said transmission gears may be caused to mesh with and unmesh from its coöperating drive gear on said counter-shaft, and various speeds may be thereby transmitted to the shaft $1^b$, which in turn drives the wheels of the automobile, not shown, at various speeds. Thus when the gears 12, 13 are unmeshed, the counter-shaft 7 driven by gears 5, 6 from shaft-section $1^a$, runs idly and no motion is transmitted to the shaft-section $1^b$, and when the gears 13, 10 are meshed a low speed is imparted to the shaft-section $1^b$. Likewise, when the gears 12, 9 are meshed a higher speed is transmitted to the shaft $1^b$, and when the gear 12 having an internal gear 14 is shifted to mesh the internal gear with the portion $5^a$ of wide gear 5 the shaft-section $1^b$ is driven at highest speed, directly from shaft-section $1^a$. In order to rotate the shaft $1^b$ oppositely for reversing the automobile wheels, the gear 13 is meshed with an intermediate idler-gear 15, which is mounted on a stud 16 fixed to casing 3 and is driven by a drive gear 17 carried upon the counter-shaft 7. The gears are meshed and unmeshed by means of shifting devices 18, 19 which comprise hubs 20 carried upon a rod 21 mounted in guiding ways $3^a$ of casing 3, arms 22 extending from said hubs, and forked portions 23 at the extremities of said arms that embrace shouldered collars 4 of the shiftable gears.

Within a notch 25 in the hub 20 of each shifting device is carried a locking latch 26, which consists of a pin 27 having a flange 28 and a flattened portion 29 the lower part of which is located within the notch 25. And normally a spring 30 surrounding said pin presses against its flange 28 and lodges the upper part of its portion 29 within a receiving recess 31 formed in a plate 32 secured to the casing 3, whereby the shifting device is firmly maintained locked and shifting thereof is prevented while the gear carried thereby is maintained locked in unmeshed state. The latches 26 bear against the walls 33 of their recesses 31, and in this manner prevent movement of the shifting devices 18, 19 and the gears 12, 13 carried thereby toward the right or toward the left while the gears are in unmeshed or neutral position.

The rod 21 is shiftable longitudinally through the guiding ways $3^a$ and through the hubs 20 of the shifting devices 18, 19, 10 either toward the right, from a neutral position, shown in the drawing or toward the left from the neutral position, and said rod may be shifted backwardly from either of the said positions to where it has been moved to its initial or neutral position. Said rod is provided with transverse notches 34 which register with the latches 26 when said rod is at its midway or neutral position, whereby upon pressing down any one of the latches 26, contrary to spring 30, toward the rod 21 while it is in neutral position, or just before it has returned to neutral position, the upper part of the flat latch-portion 29 is caused to leave its recess 31 in plate 32 and the lower part of this portion is compelled to enter its registering notch 34 in the rod, in which manner the particular shifting device carrying said latch is unlocked from the plate 32 and locked firmly to the rod 21. And hence, upon movement of the rod 21 from its neutral position said locked shifting device is carried along and shifted toward the right, as viewed in the drawing, if the rod has been shifted toward the right, but if the rod 21 has been shifted toward the left the shifting device thus locked thereto is carried along by the rod in an opposite direction and shifted from neutral position toward the left, whereby the gear carried by this shifting device 18 or 19, as the case may be, can be shifted in opposite directions from a neutral position and meshed with either of its coöperating drive gears. Conversely, during a subsequent return stroke of the rods 21 toward neutral position the shifting device previously locked thereto is shifted back and restored to neutral position, and the spring 30 of its latch then causes the latch-portion 29 to clear its notch 34 of the rod and to reënter its recess 31 in plate 32, in which manner the shifting device is restored to initial or locked neutral position and the gear carried thereby is unmeshed. Upon a subsequent stroke of the rod 21 away from its neutral position in any direction it either moves idly or together with the other shifting device or with the same shifting device, according to whichever of said devices has been locked thereto. During the movement of the shifting device its latch 26 is carried along therewith and the lower part of the flat portion 29 of the latch is maintained within its notch 34 in the rod 21 by the plate 32 bearing upon the upper face of said flat portion 29, the pin 27 of said latch being meanwhile retained within an elongated slot 35 in plate 32, Figs. 1 and 6.

A magnet 36 is provided for each of the latches 26 which when energized causes its armature 37 hinged at 38 to press down upon the flange 28 of its latch contrary to the pressure of the latch-spring 30. Said armature thereby compels the latch 26 to enter its registering rod-notch 34 and to lock its shifting devices to the rod 21 at the moment said rod reaches the termination of its return stroke toward neutral position.

The rod 21 is shifted in directions away from its neutral position by means of solenoids 39, 40 secured to the frame-work 41 of the machine. Said rod extends outwardly from the gear-casing 3 and carries cores 42, 43 that belong to and are located within the solenoids 39, 40 respectively. When the solenoid 39 is energized its core 42 is drawn thereinto and the rod 21 is thereupon shifted from neutral position toward the right, while when the solenoid 40 is energized its core 43 is drawn therewithin and the rod 21 is thus shifted from its neutral position toward the left. Therefore, whichever of the devices 18 or 19 and the gear carried thereby has been previously locked to the rod 21 such device is shifted in one direction or in an opposite direction from its neutral position and its gear meshed accordingly, depending upon whether the solenoid 39 or 40 has been thereupon energized.

In order to shift the rod 21 backwardly, from either of the opposite positions to which it has been moved, to its initial position, a double acting cam 44 is provided, a stem 45 of which is guided in a bracket 46, fixed upon casing 3 to slide toward and away from a pin 47 secured to the rod 21. When the rod 21 is shifted away from its neutral position the pin 47 is disposed adjacent to the wing 44$^a$ or 44$^b$ of cam 44, as shown by the dash and dot lines, depending upon the direction in which the rod has been moved. Upon sliding the cam 44 toward the pin 47, therefore, the cam-wing 44$^a$ or 44$^b$ adjacent to which the pin 47 is located presses against said pin and thereby actuates the rod 21 and moves it to neutral position. And hence, whichever of the devices 18, 19 should happen to be locked to the rod 21 with its gear in meshed state, such device will be then returned to neutral position and its gear will become unmeshed, the latch 26 thereupon locking the device with its gear in neutral position to the fixed plate 32. The cam 47 is then slid back to its normal position shown, in which situation it permits the rod 21 to be again moved by the solenoids 39, 40 in any direction from neutral position to shift any one of the devices 18, 19 and gears 12, 13 from their neutral state to mesh any coöperating pair of the gears.

Circuits for the magnets 36 and solenoids 39, 40 are opened and closed by means of a circuit-conducting arm 48, which is fixed to a rocking-rod 49 and may be swung therewith and about the axis thereof to contact it with segmental terminal plates 50, 51, 52 and any one of terminal contacts 53, 54, 55, and 56. The rod 49 extends from the arm 48, through and outwardly from the steering column 57 of the machine, and is provided at its extremity above the steering wheel 58 with a lever 59 wherewith the rod may be rocked to swing the arm 48. A pointer 60 extends from the extremity of lever 59 and around the outer side of a segmental frame 61, which is concentric with the rod 49 and is secured to the column 57 by means of brackets 62. Upon the frame 61 are marked speed indications, such as "Reverse" or "R", "1st", "2nd", "Direct" or "3rd", and "N" or "Neutral", and the lever 59 with its pointer 60 may be swung to point to any one of said indications.

In the operation of the gear transmission the lever 59 may be set to point to any one of the indications upon indicator-frame 61, according to whichever coöperating pair of gears it is desired to mesh in the selection of speeds for the automobile wheels, and we will assume that said lever has been set to point to "R" or "Reverse". The arm 48 is thereby set to join the terminal-plates 50, 51 and terminal-contact 53, and closes the breaks of branch circuits which when having current therethrough energize the magnet 36 belonging to shifting device 19, and the solenoid 39. Lever 59 having been set to the desired speed indication the remaining step in the operation of selecting a particular speed is to press and release a foot-pedal 63, which is fulcrumed at 64 and is utilized for operating the drive-shaft clutch 2. Said pedal is connected to the clutch 2 by means of a forked arm 65 that embraces the cone-portion 66 of the clutch. Pressing of the pedal 63 moves the cone-portion 66 toward the right contrary to the pressure of clutch-spring 67 and disengages it from its coöperating clutch member 68 to unclutch the shaft-portions 1, 1ᵃ. Releasing of the pedal causes the spring 67 to engage the cone portion 66 with the member 68 to clutch the shaft-portions 1, 1ᵃ, and to simultaneously swing the pedal back toward the right to its normal position shown in the drawing. Upon pressing of the foot-pedal 63 the drive-shaft portions 1, 1ᵃ are unclutched, and during the unclutching operation a link 69 pivoted to pedal 63 at 70 and to an arm 71 of a plate 72 is drawn by said pedal to impart a stroke or partial rotation to the plate 72 in an anti-clockwise direction, as viewed in the drawing, about a stud 73 upon which this plate is pivoted. The plate 72 carries a latch 74 slidable within a guide 75 thereof toward and away from a notch 76 in the plate, and a portion 77 of said latch normally rests within the notch 76 and also within a registering notch 78 of a lever 79 fulcrumed upon the stud 73, whereby the plate 72 and the lever 79 are normally locked together, a spring 80 bearing against guide 75 and said latch holding the latch-portion 77 in pressed state within both of said notches. The lever 79 passes through a recess 45ᵃ in stem 45, so that movement of the lever causes it to actuate said stem with the cam-wings 44.

During a portion of the stroke of plate 72 a circuit-closing plate 81 forming part thereof joins a pair of contacts 82, whereupon current flows from battery 83, along wire 84, plate 50, arm 48, plate 51, wire 85, through magnet 36 of device 19, along wire 86, contacts 82, and wire 87 back to said battery. Said magnet 36 is thereby energized, and attracting its armature 37 causes the latch 26 of device 19 to be pressed into its notch 34 in rod 21 and to lock the device 19 to said rod. The plate 72 continuing farther and completing said stroke causes the closer 81 to join a pair of contacts 88. This closes the circuit from battery 83, along wire 84, plate 50, arm 48, contact 53, wire 89, through solenoid 39, along wire 90, wire 91, contacts 88, closer 81, and wire 87 back to the battery, whereby said solenoid being energized moves the rod 21 together with the device 19 and the gear 13 toward the right and meshes the gears 13, 15. The pedal 63 is then released and the plate 72 returned to its normal position shown in the drawing, thus breaking the circuits that have been closed, leaving the gears 13, 15 meshed, and hence completing the operation of selecting the "reverse" speed.

Should it be desired to unmesh the gears 13, 15 and to mesh any other coöperating pair of gears such as the gears 13, 10 for low speed, the lever 59 is set to point at "L," corresponding to such selection of speed, and the pedal 63 is then pressed and released. Thereupon the stroke is imparted to the plate 72 which during the initial portion of its stroke causes its closer 81 to join the contacts 82 and to direct the current to flow as formerly and to energize the magnet 36 of device 19 to press its latch 26 toward the rod 21. During this portion of its stroke the plate 22 carries the locked lever 79 therewith and causes it to move the stem 45 and cam 44 toward the pin 47, whereupon the cam-wing 44ᵃ engages the pin 47 and moves the rod 21 back toward the left to neutral position, thereby restoring the device 19 to neutral position and unmeshing the gear 13 from the gear 15 and locking firmly the gear 13 and device 19 in neutral position to the fixed plate 32. Coincident with the completion of this neutralizing operation a projection 92 forming part of the locking latch 74 rides over upon a fixed cam 93, which thereby forces it to actuate said locking latch contrary to the pressure of its spring 75 and to pull its portion 77 out of the notches 76, 78. The lever 79 thereupon becoming unlocked from the plate 72 is at once returned to initial position by means of a spring 94 and restores the stem 45 and cam 44 to the normal position shown to clear the pin 47. Continuing farther on its stroke, independently of lever 79, the plate 72 then causes its closer 81 to join the contacts 88. This closes the circuit from battery 83, along wire 84, plate 50, arm 48, contact 54, wire 95, through solenoid 40, along wire 96, contacts 88, and wire 87 back to the battery. The solenoid 40 thus becomes energized and attracting its core 43 moves the rod 21 and the device 19 with the gear 13 toward the left from neutral position and meshes the gears 13, 10. Upon the releasing movement of the pedal 63 it restores the plate 72 to normal position, whereupon the circuits that have been previously closed are broken and the notches 76, 78 are brought back to registry, so that the latch-portion 77 reënters said notches and locks the plate 74 and lever 79 together, ready for a next operation. It will be evident that the entire above-described operation is momentarily performed, requiring on the part of the operator merely the setting of the lever 59 and pressing of the pedal 63.

It will be seen by following the circuits in the drawing that in a similar manner setting of the lever 59 to point at "3rd" or highest speed and pressing of the pedal 63 will first unmesh and neutralize any coöperating pair of gears that may be meshed, the magnet 36 belonging to the shifting device 18 will be then energized and will lock said device to the rod 21, and then the solenoid 40 will be energized and will move the rod 21 toward the left from its neutral position to actuate and mesh the internal gear 14 inside of gear 12 with the gear 5 for direct driving. Likewise, setting of the lever 59 to point at "2nd" or intermediate speed and pressing of said pedal will energize the magnet 36 belonging to device 18 and will lock said device to the rod 21, and then the solenoid 39 will be energized and will actuate the rod 21 to move and mesh the gears 12, 9.

Should it be desired to unmesh or neutralize any coöperating pair of gears that may be meshed, without necessarily selecting any other speed or meshing any other pair of gears, the lever 59 may be set to point at "N" or "Neutral" upon indicator-frame 61, so that the arm 48 is placed out of contact with the circuits, whereby upon subsequently pressing of the pedal 63 the plate 72, lever 79, and cam 44 are operated to move the rod 21 to neutral position, and hence any gear that may be in mesh is unmeshed and restored to locked neutral position. It will be evident that with this mechanism any predetermined selection of speed desired may be made at any time before or after the swinging of the pedal 63 to perform the clutching operation of the driveshaft, and such speed selection may be also made at any time and stage during the clutching operation.

Variations may be resorted to within the scope of the invention, and portions of the improvements may be used without others.

Having thus described my invention, I claim:—

1. In an automobile, the combination of speed changing gears, a movable member, means to lock any one of said gears to said member, means to move said member away from a neutral position, means to move said member away from neutral position in an opposite direction, and means to restore said member to neutral position from any one of said moved positions.

2. In an automobile, the combination of speed changing gears, a movable member, means to lock any one of said gears to said member, means to move said member to positions in opposite directions from a neutral position, and means to restore said member to neutral position from any one of said moved positions.

3. In an automobile, the combination of a plurality of speed changing gears, a shifting device for each of said gears, a movable member, a locking means for each of said devices to lock it to said member, means to move said member to positions in opposite directions from a neutral position, and means to restore said member to neutral position from any one of said moved positions.

4. In an automobile, the combination of a plurality of speed changing gears, a shifting device for each of said gears, a movable member, means to lock any one of said devices to said member at points therealong, means to move said member to positions in opposite directions from a neutral position, and means to restore said member to neutral position from any one of said moved positions.

5. In an automobile, the combination of a plurality of speed changing gears, a shifting device for each of said gears, a member movable in a direction parallel to the axes of said gears, a locking means for each of said devices to lock it to said member, means to move said member to positions in opposite directions from a neutral position, and means to restore said member to neutral position from any one of said moved positions.

6. In an automobile, the combination of a plurality of speed changing gears, a shifting device for each of said gears, a rod passing through said devices parallel to the axes of said gears, a locking means for each of said devices to lock it to said member, means to move said member to positions in opposite directions from a neutral position, and means to restore said member to neutral position from any one of said moved positions.

7. In an automobile, the combination of speed changing gears, a movable member, means to lock any one of said gears to said member, and electrical means to move said member to positions in opposite directions from a neutral position.

8. In an automobile, the combination of speed changing gears, a movable member, means to lock any one of said gears to said member, electrical means to move said member to positions in opposite directions from a neutral position, and means to restore said member to neutral position from any one of said moved positions.

9. In an automobile, the combination of a plurality of speed changing gears, a shifting device for each of said gears, a movable member, an electrically operated means for each of said devices to lock it to said member, and electrical means to move said member to positions in opposite directions from a neutral position.

10. In an automobile, the combination of a plurality of speed changing gears, a shifting device for each of said gears, a movable member, a locking means for each of said devices to lock it to said member, and electrical means to move said member to positions in opposite directions from a neutral position.

11. In an automobile, the combination of a plurality of speed changing gears, a shifting device for each of said gears, a movable member, means to lock any one of said devices to said member, means to move said member with the locked device to positions in opposite directions from a neutral position, means to restore said member with the locked device to neutral position from any one of said moved positions, and means to lock said restored device in neutral position.

12. In an automobile, the combination with a drive shaft, a clutch therefor, means to operate said clutch, and speed changing gears, of a movable member, means to lock any one of said gears to said member, and means to move said member from any one of opposite positions toward a neutral position through the operation of said clutch operating means.

13. In an automobile, the combination with a drive shaft, a clutch therefor, means to operate said clutch, and speed changing gears, of a movable member, means to lock any one of said gears to said member, means to move said member to positions in opposite directions from a neutral position, and means to restore said member to neutral position from any one of said moved positions through the operation of said clutch operating means.

14. In an automobile, the combination with a drive shaft, a clutch therefor, means to operate said clutch, and speed changing gears, of a movable member, means to lock any one of said gears to said member, electrical means to move said member to positions in opposite directions from a neutral position, and means to restore said member to neutral position from any one of said moved positions through the operation of said clutch operating means.

15. In an automobile, the combination with a drive shaft, a clutch therefor, a pedal to operate said clutch, and speed changing gears, of a movable member, means to lock any one of said gears to said member, and means to move said member from any one of opposite positions toward a neutral position through the operation of said pedal.

16. In an automobile, the combination with a drive shaft, a clutch therefor, a pedal to operate said clutch, and speed changing gears, of a movable member, means to lock any one of said gears to said member, means to move said member to positions in opposite directions from a neutral position, and means to restore said member to neutral position from any one of said moved positions through the operation of said pedal.

17. In an automobile, the combination with a drive shaft, a clutch therefor, a pedal to operate said clutch, and speed changing gears, of a movable member, means to lock any one of said gears to said member, electrical means to move said member to positions in opposite directions from a neutral position, and means to restore said member to neutral position from any one of said moved positions through the operation of said pedal.

18. In an automobile, the combination of speed changing gears, a movable member, means to lock any one of said gears to said member, means to select the direction of movement of said member, and means to move said member in the direction selected.

19. In an automobile, the combination of speed changing gears, a movable member, means to lock any one of said gears to said member, means to select the direction of movement of said member, means to move said member in the direction selected, and means to restore said member to initial position.

20. In an automobile, the combination of speed changing gears, a member movable in opposite directions from a neutral position, means to lock any one of said gears to said member, means to select the direction of movement of said member, and means to move said member in the direction selected.

21. In an automobile, the combination of speed changing gears, a member movable in opposite directions from a neutral position, means to lock any one of said gears to said member, means to select the direction of movement of said member, means to move said member in the direction selected, and means to restore said member to neutral position.

22. In an automobile, the combination of speed changing gears, a movable member, means to lock any one of said gears to said member, means to select the direction of movement of said member, and electrical means to move said member in the direction selected.

23. In an automobile, the combination with a drive shaft, a clutch therefor, means to operate said clutch, and speed changing gears, of a movable member, means to lock any one of said gears to said member, means to select the direction of movement of said member, means to move said member in the direction selected, and means to restore said member to initial position through the operation of said clutch operating means.

24. In an automobile, the combination with a drive shaft, a clutch therefor, means to operate said clutch, and speed changing gears, of a movable member, means to lock any one of said gears to said member, means to select the direction of movement of said member, means to move said member in the direction selected, means to restore said member to initial position through the operation of said clutch operating means, and means to release said restoring means and render it inoperative before movement of said member in the direction selected.

25. In an automobile, the combination with a drive shaft, a clutch therefor, means to operate said clutch, and speed changing gears, of a movable member, means to lock any one of said gears to said member, means to select the direction of movement of said member, means to move said member in the direction selected through the operation of said clutch operating means, and means to restore said member to initial position through the operation of said clutch operating means.

26. In an automobile, the combination with a drive shaft, a clutch therefor, means to operate said clutch, and speed changing gears, of a movable member, means to lock any one of said gears to said member, means to select the direction of movement of said member, means to move said member in the direction selected through the operation of said clutch operating means, and means to release said restoring means and render it inoperative before movement of said member in the direction selected.

27. In an automobile, the combination of speed changing gears, a member movable in opposite directions from a neutral position, means to lock any one of said gears to said member, means to select the direction of movement of said member, means to move said member in the direction selected, and means to set said locking and selecting means for subsequent operation while said member is in the position to which it was moved.

28. In an automobile, the combination of a plurality of speed changing gears, a shifting device for each of said gears, a movable member, an independently operated locking means for each of said devices to lock it to said member, means to move said member to positions in opposite directions from a neutral position, and means to restore said member to neutral position from any one of said moved positions.

Signed at the city of New York, in the county of New York, and State of New York, this 27th day of May, A. D. 1916.

MERION J. HUGGINS.

Witnesses:
CHAS. W. LA RUE,
B. ROMAN.